(12) United States Patent
Shimada et al.

(10) Patent No.: US 6,549,711 B1
(45) Date of Patent: Apr. 15, 2003

(54) SOLITON PULSE COMPRESSION OPTICAL FIBER AND METHOD FOR MAKING SOLITON PULSE COMPRESSION OPTICAL FIBER

(75) Inventors: Tadakatsu Shimada, Gunma (JP); Kazuo Koya, Gunma (JP); Noboru Edagawa, Tokyo (JP); Masatoshi Suzuki, Tokyo (JP); Itsuro Morita, Tokyo (JP)

(73) Assignees: Shin-Etsu Chemical Co., Ltd., Tokyo (JP); KDD Corporation, Tokyo (JP)

( * ) Notice: Subject to any disclaimer, the term of this patent is extended or adjusted under 35 U.S.C. 154(b) by 0 days.

(21) Appl. No.: 09/240,593

(22) Filed: Feb. 1, 1999

(30) Foreign Application Priority Data

Jan. 30, 1998 (JP) .......................... 10-018987

(51) Int. Cl.[7] .................. G02B 6/02; C03B 37/023; C03B 37/02
(52) U.S. Cl. .................. 385/123; 385/124; 65/385; 65/435
(58) Field of Search ................. 385/123–128; 65/385, 435

(56) References Cited

U.S. PATENT DOCUMENTS

| | | | | |
|---|---|---|---|---|
| 5,363,386 A | * | 11/1994 | Smith | 372/6 |
| 5,504,829 A | * | 4/1996 | Evans et al. | 385/123 |
| 5,838,867 A | * | 11/1998 | Onishi et al. | 385/123 |
| 6,173,096 B1 | * | 1/2001 | Bagley et al. | 385/50 |
| 6,173,588 B1 | * | 1/2001 | Berkey et al. | 65/407 |
| 6,181,858 B1 | * | 1/2001 | Kato et al. | 385/123 |
| 6,195,492 B1 | * | 2/2001 | Hawk | 385/123 |

FOREIGN PATENT DOCUMENTS

JP         7-157324         6/1995

OTHER PUBLICATIONS

KDD R&D Laboratories, Proceedings of the 1995 Communications Society Conference of IEICE, B731, Sep. 5–8, 1995.

* cited by examiner

*Primary Examiner*—Rodney Bovernick
*Assistant Examiner*—Juliana K. Kang
(74) *Attorney, Agent, or Firm*—Pillsbury Winthrop LLP

(57) ABSTRACT

The soliton pulse compression optical fiber comprises a core and a clad that surrounds the core for compressing the injected light pulse in width. The maximum relative index difference between the core and the clad is between about 1.2% and 2.5%. The core diameter of the soliton pulse compression optical fiber varies along the length of the soliton pulse compression optical fiber and the core has a step-like refractive index distribution. The optical fiber perform of the soliton pulse compression optical fiber comprises a core preform, which is to be a core of the soliton pulse compression optical fiber, and a clad preform that surrounds the core preform. The maximum relative index difference between the core perform and the clad preform is also between about 1.2% and 2.5%.

21 Claims, 6 Drawing Sheets

SOLITON PULSE COMPRESSION OPTICAL FIBER AND METHOD FOR MAKING SOLITON PULSE COMPRESSION OPTICAL FIBER

This patent application claims priority based on Japanese patent application H10-18987 filed on Jan. 30, 1998, the contents of which are incorporated by reference.

BACKGROUND OF THE INVENTION

1. Field of Invention

The present invention relates to a soliton pulse compression optical fiber and a method for making a soliton pulse compression optical fiber.

2. Description of Related Art

Optical soliton transmission is a technology which uses an optical soliton to transmit a large number of signals over a long distance. A soliton is a solitary wave that acts like a particle. When an optical soliton is propagated within an optical fiber, the optical soliton maintains its original waveform over a long distance. To transmit a large number of signals by optical soliton transmission, the width of the optical soliton pulse has to be small.

The dispersion decreasing fiber, DDF, is reported in the proceedings of the 1995 communications society conference of IEICE, B-731, to be capable of decreasing the width of an optical soliton pulse which is propagated within an optical fiber. The dispersion decreasing fiber has the characteristic of decreasing dispersion in the longitudinal direction of the optical fiber, that is, along the length of the optical fiber.

The method for making the dispersion decreasing fiber disclosed in Japanese Patent Application Laid-Open No. H7-157324 is to cut the clad of the optical fiber preform so as to make a rod which is taper-shaped in the longitudinal direction, and to pull the optical fiber preform in such a manner as to produce an optical fiber having a uniform diameter.

FIG. 1 shows the relationship among the cutoff wavelength λc, the dispersion D, and the modal field diameter MFD of the dispersion decreasing fiber made by cutting the clad of the optical fiber preform. The larger the cutoff wavelength λc is, the smaller the clad thickness is. And the smaller the cutoff wavelength λc is, the larger the clad thickness is. The cutoff wavelength λc is the wavelength which determines whether the optical fiber performs as a multi-mode type fiber or as a single-mode type fiber. If the wavelength of injected light is longer than the cutoff wavelength λc, the optical fiber performs as a single-mode fiber. And, if the wavelength of injected light is shorter than the cutoff wavelength λc, the optical fiber performs as a multi-mode fiber.

Dispersion, D, is a phenomenon whereby the width of a light pulse increases as the light pulse is propagated through an optical fiber. The dispersion is a measure of the broadening of the group delay time per 1 km of fiber length, and per 1 nm of spectral width of light source. The unit of dispersion is expressed as ps/nm/km. If the maximum value of the intensity distribution in an optical fiber is 1, the diameter corresponding to an intensity distribution of $1/e^2$ is the modal field diameter, where e is the base of the natural logarithm, e=2.71.

It is desirable to decrease the dispersion occurring along the length of a dispersion decreasing fiber from 13.7 ps/nm/km to 2.3 ps/nm/km so as to compress light pulses having large widths. The regions where the dispersion decreases from 13.7 ps/nm/km to 2.3 ps/nm/km correspond to regions 20 and 22 in FIG. 1. When the dispersion is 13.7 ps/nm/km, the modal field diameter becomes as large as 6.6 μm, a region 20. When the modal field diameter becomes large, the bending loss also becomes large. Bending loss occurs when light leaks from the core to the clad when an optical fiber is bent. Light cannot propagate through an optical fiber when the bending loss is large.

On the other hand, if light having a wavelength of 1.55 μm is used and the cutoff wavelength is set to be less than 1.55 μm, the cutoff wavelength becomes larger than 1.55 μm when the dispersion becomes larger than 2 ps/nm/km. Thus, the dispersion decreasing fiber cannot be used as single-mode fiber at any band where the cutoff wavelength is less than 1.55 μm.

SUMMARY OF THE INVENTION

Therefore, it is an object of the present invention to provide a soliton pulse compression optical fiber and a method for making a soliton pulse compression optical fiber which is capable of solving the problems described above.

According to a first aspect of the present invention, the soliton pulse compression optical fiber for compressing the injected light pulse in width comprises a core and a clad that surrounds the core wherein a maximum relative index difference between the core and the clad is between about 1.2% and 2.5%. According to a second aspect of the present invention, the soliton pulse compression optical fiber has a maximum relative index difference between the core and the clad between about 1.2% and 1.5%. According to a third aspect of the present invention, the soliton pulse compression optical fiber has a maximum relative index difference between the core and the clad of about 1.5%.

According to a fourth aspect of the present invention, the soliton pulse compression optical fiber has a core diameter that varies along the length of the soliton pulse compression optical fiber. According to a fifth aspect of the present invention, the core of the soliton pulse compression optical fiber has a step-like refractive index distribution.

According to a sixth aspect of the present invention, the optical fiber preform of the soliton pulse compression optical fiber comprises a core preform, which is to be a core of soliton pulse compression optical fiber, and a clad preform that surrounds the core preform, wherein the maximum relative index difference between the core preform and the clad preform is between about 1.2% and 2.5%.

According to a seventh aspect of the present invention, the method for making an optical fiber preform of a soliton pulse compression optical fiber comprises the steps of preparing a core preform to be the core of the soliton pulse compression optical fiber and forming a clad preform that surrounds the core preform, wherein the maximum relative index difference between the core preform and the clad preform is between about 1.2% and 2.5%

According to an eighth aspect of the present invention, the method for making a soliton pulse compression optical fiber comprises the steps of preparing a core preform to be the core of the soliton pulse compression optical fiber, forming a clad preform that surrounds the core preform with a maximum relative index difference between core preform and clad preform of between about 1.2% and 2.5%, and pulling the soliton pulse compression optical fiber preform, wherein the diameter of the soliton pulse compression optical fiber varies in the longitudinal direction.

According to a ninth aspect of the present invention, the method for making a soliton pulse compression optical fiber results in a soliton pulse compression optical fiber having a maximum relative index difference between the core and the clad of between about 1.2% and 1.5.%. According to a tenth aspect of the present invention, the method for making a soliton pulse compression optical fiber results in a soliton pulse compression optical fiber having a maximum relative index difference between the core and the clad of about 1.5%.

According to an eleventh aspect of the present invention, the method for making a soliton pulse compression optical fiber further has a core diameter which varies along the length of the soliton pulse compression optical fiber. According to a twelfth aspect of the present invention, the method for making a soliton pulse compression optical fiber has a step-like refractive index distribution.

DETAILED DESCRIPTION OF THE INVENTION

Figure 1:
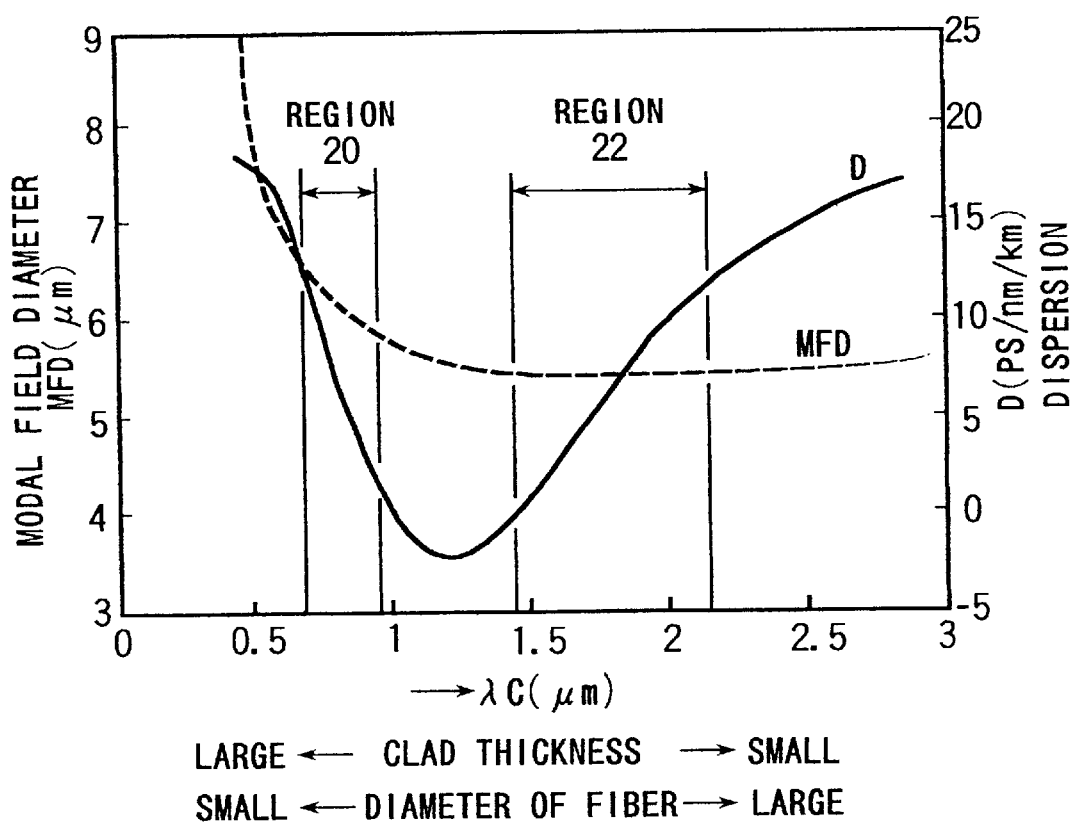
FIG. 1 shows the relationship among the cutoff wavelength λc, the dispersion D, and the modal field diameter MFD of the dispersion decreasing fiber made by cutting the clad of the optical fiber preform.
Figure 2:
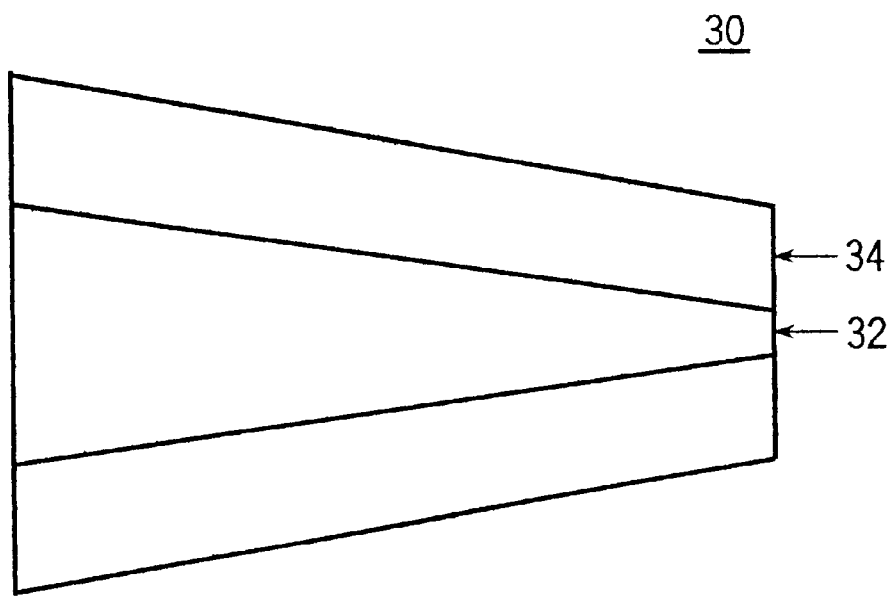
FIG. 2 is a cross sectional view of the present invention of the soliton pulse compression optical fiber in the longitudinal direction, that is, along the length of the soliton pulse compression optical fiber.

FIG. 2 is a cross sectional view of the present invention of the soliton pulse compression optical fiber in the longitudinal direction. The soliton pulse compression optical fiber 30 has a core 32 and a clad 34 that surrounds the core 32. The diameters of both the core 32 and the soliton pulse compression optical fiber 30 vary in the longitudinal direction. The dispersion should vary in the longitudinal direction to compress the soliton pulse. And the dispersion varies in the longitudinal direction when the diameter of the core varies in the longitudinal direction. It is desirable for the diameter of the core 32 to vary in the longitudinal direction from 1 μm to 20 μm. It is desirable for the refractive index distribution of the core 32 to be step-like in form. If the refractive index distribution of the core 32 is not step-like, the soliton pulse will not be stable.

The wavelength 1.55 μm is usually used for an optical fiber. Thus, it is also desirable to set the cutoff wavelength λc to be less than 1.55 μm for the soliton pulse compression optical fiber 30. It is desirable for the maximum relative index difference $\Delta n_{max}$ between the core 32 and the clad 34 to be between 1.2% and 2.5%. If the maximum relative index difference is smaller than 1.2%, the modal field diameter becomes too large, causing bending loss in the region where the dispersion is about 0 ps/nm/km. Also, if the maximum relative index difference $\Delta n_{max}$ is larger than 2.5%, the cutoff wavelength λc become larger than 1.55 μm, and thus the soliton pulse compression optical fiber 30 cannot be used as a single-mode optical fiber at bands shorter than 1.55 μm.

FIGS. 3 through 8 show the relationship among the cutoff wavelength λc, the dispersion D, and the modal field diameter MFD of the soliton pulse compression optical fiber 30 when the maximum relative index difference $\Delta n_{max}$ is from 1.0% to 3.0%.

Figure 3:
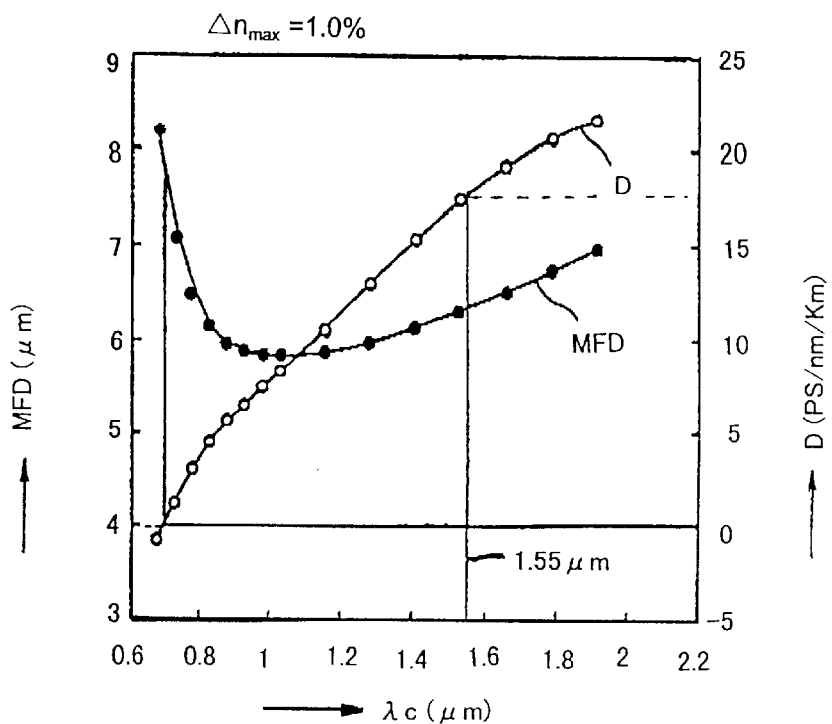
FIG. 3 shows the relationship among the cutoff wavelength λc, the dispersion D, and the modal field diameter MFD of the soliton pulse compression optical fiber when the maximum relative index difference $\Delta n_{max}$ is 1.0%.

FIG. 3 shows the relationship among the cutoff wavelength λc, the dispersion D, and the modal field diameter MFD of a the soliton pulse compression optical fiber 30 when the maximum relative index difference $\Delta n_{max}$ is 1.0%. The dispersion has to decrease from 13 ps/nm/km to 0 ps/nm/km along the length of the soliton pulse compression optical fiber 30, but the modal field diameter becomes 7.6 μm in the region where the dispersion D is about 0 ps/nm/km. Thus, the bending loss will increase.

Figure 4:
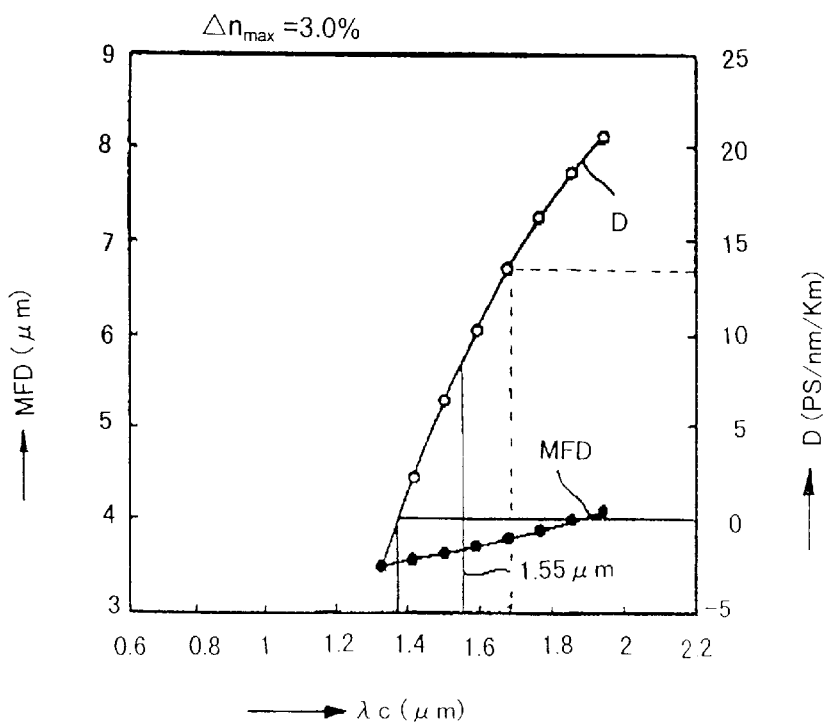
FIG. 4 shows the relationship among the cutoff wavelength λc, the dispersion D, and the modal field diameter MFD of the soliton pulse compression optical fiber when the maximum relative index difference $\Delta n_{max}$ is 3.0%.

FIG. 4 shows the relationship among the cutoff wavelength λc, the dispersion D, and the modal field diameter MFD of the soliton pulse compression optical fiber 30 when the maximum relative index difference $\Delta n_{max}$ is 3.0%. The dispersion of the soliton pulse compression optical fiber 30 should decrease from 13 ps/nm/km to 0 ps/nm/km in the longitudinal direction. However, the cutoff wavelength is 1.65 μm in the region where the dispersion is about 13 ps/nm/km. Therefore, the soliton pulse compression optical fiber 30 cannot be used as a single-mode fiber at any band where the cutoff wavelength is less than 1.55 μm.

FIGS. 5 through 8 show the relationship among the cutoff wavelength λc, the dispersion D, and the modal field diameter MFD of the soliton pulse compression optical fiber 30 when the maximum relative index difference $\Delta n_{max}$ is between 1.2% and 2.5%.

Figure 5:
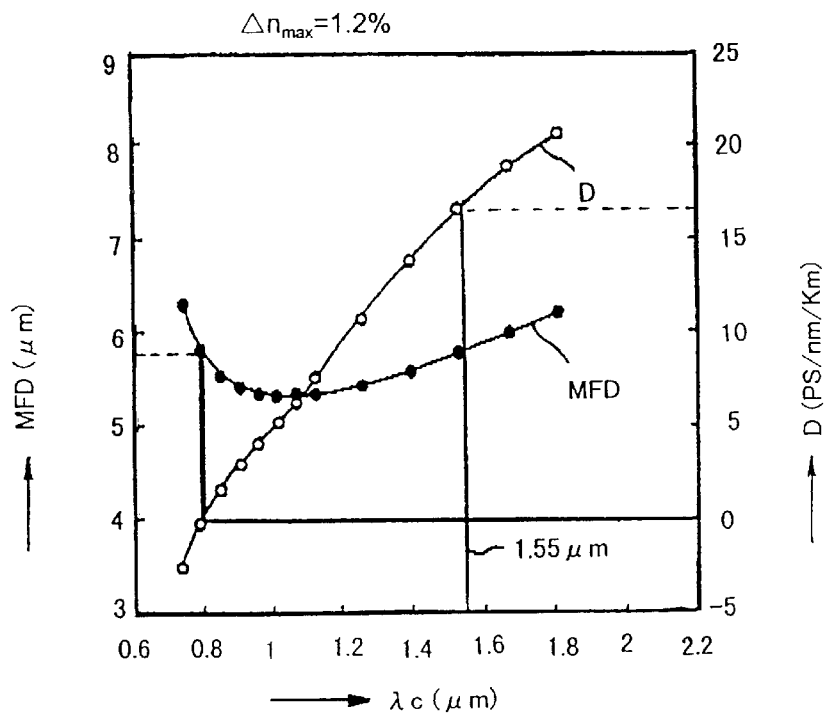
FIG. 5 shows the relationship among the cutoff wavelength λc, the dispersion D, and the modal field diameter MFD of the soliton pulse compression optical fiber when the maximum relative index difference $\Delta n_{max}$ is 1.2%.

FIG. 5 shows the relationship among the cutoff wavelength λc, the dispersion D, and the modal field diameter MFD of the soliton pulse compression optical fiber 30 when the maximum relative index difference $\Delta n_{max}$ is 1.2%. The dispersion D should decrease from 17 ps/nm/km to 0 ps/nm/km in the longitudinal direction in the region where the cutoff wavelength λc is less than 1.55 μm. Because the modal field diameter MFD is small, specifically 5.8 μm, in the region where the dispersion D is about 0 ps/nm/km, the bending loss is small. The compressibility of the soliton pulse is also good. Because the soliton pulse compression optical fiber 30 can decrease the dispersion D from 17 ps/nm/km to 0 ps/nm/km in the longitudinal direction in the region where the cutoff wavelength λc is less than 1.55 μm, it can be used as a single-mode fiber at bands where the cutoff wavelength is less than 1.55 μm.

Figure 6:
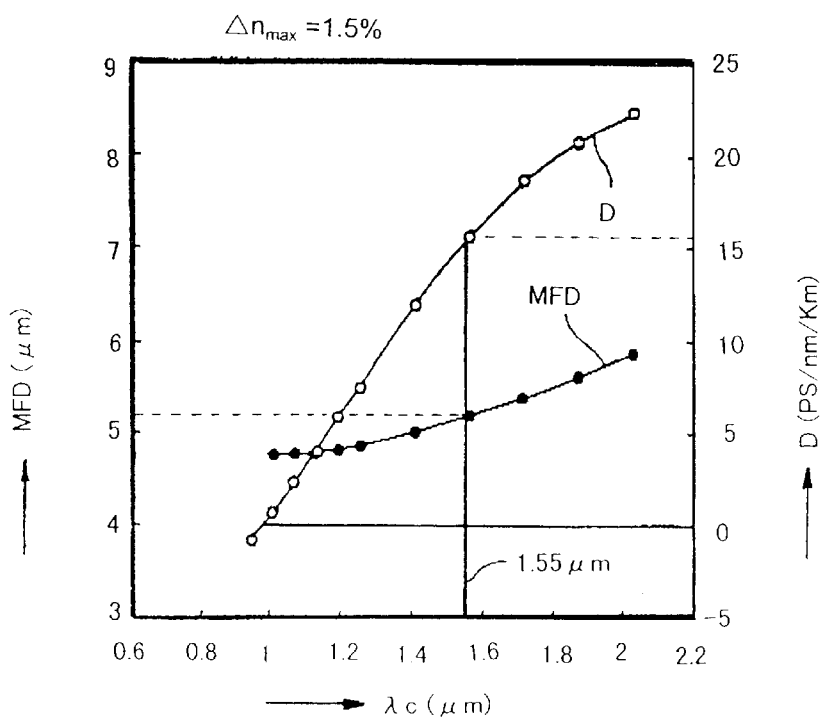
FIG. 6 shows the relationship among the cutoff wavelength λc, the dispersion D, and the modal field diameter MFD of the soliton pulse compression optical fiber when the maximum relative index difference $\Delta n_{max}$ is 1.5%.

FIG. 6 shows the relationship among the cutoff wavelength λc, the dispersion D, and the modal field diameter MFD of the soliton pulse compression optical fiber 30 when the maximum relative index difference $\Delta n_{max}$ is 1.5%. The dispersion D should decrease from 16 ps/nm/km to 0 ps/nm/km in the longitudinal direction in the region where the cutoff wavelength λc is less than 1.55 µm. Because the modal field diameter MFD is small, specifically 5.2 µm, in the region where the dispersion D is about 16 ps/nm/km, the bending loss is small. The compressibility of the soliton pulse is also good. Because the soliton pulse compression optical fiber 30 can decrease the dispersion D from 16 ps/nm/km to 0 ps/nm/km in the longitudinal direction in the region where the cutoff wavelength λc is less than 1.55 µm, it can be used as a single-mode fiber at bands where the cutoff wavelength is less than 1.55 µm.

Figure 7:
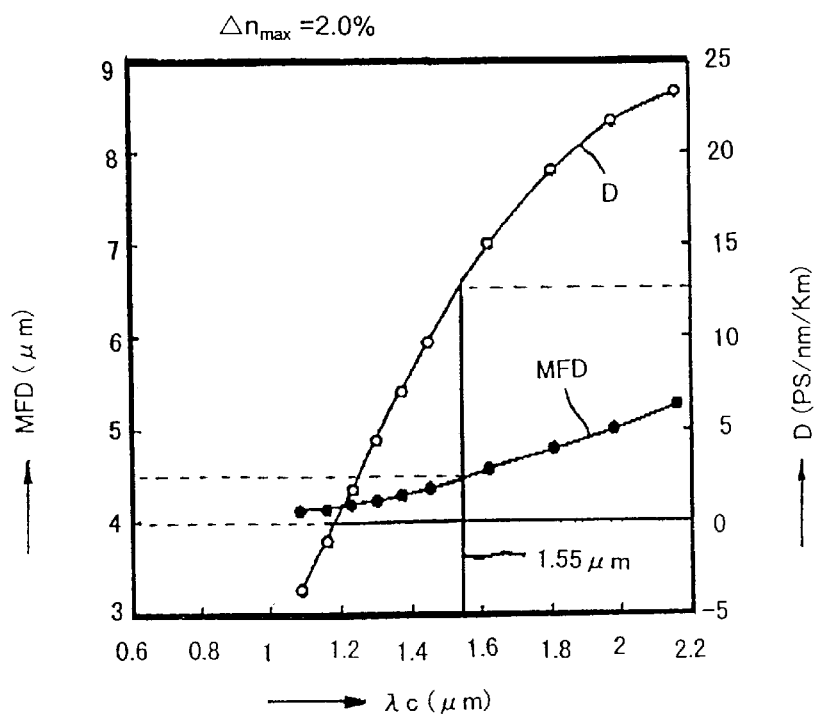
FIG. 7 shows the relationship among the cutoff wavelength λc, the dispersion D, and the modal field diameter MFD of the soliton pulse compression optical fiber when the maximum relative index difference $\Delta n_{max}$ is 2.0%.

FIG. 7 shows the relationship among the cutoff wavelength λc, the dispersion D, and the modal field diameter MFD of the soliton pulse compression optical fiber 30 when the maximum relative index difference $\Delta n_{max}$ is 2.0%. The dispersion D should decrease from 13 ps/nm/km to 0 ps/nm/km in the longitudinal direction in the region where cutoff wavelength λc is less than 1.55 µm. Because the modal field diameter MFD is small, specifically 4.5 µm, in the region where the dispersion D is about 13 ps/nm/km, the bending loss is small. The compressibility of the soliton pulse is also good. Because the soliton pulse compression optical fiber 30 can decrease the dispersion D from 13 ps/nm/km to 0 ps/nm/km in the longitudinal direction in the region where the cutoff wavelength λc is less than 1.55 µm, it can be used as a single-mode fiber at any band where the cutoff wavelength is less than 1.55 µm.

Figure 8:
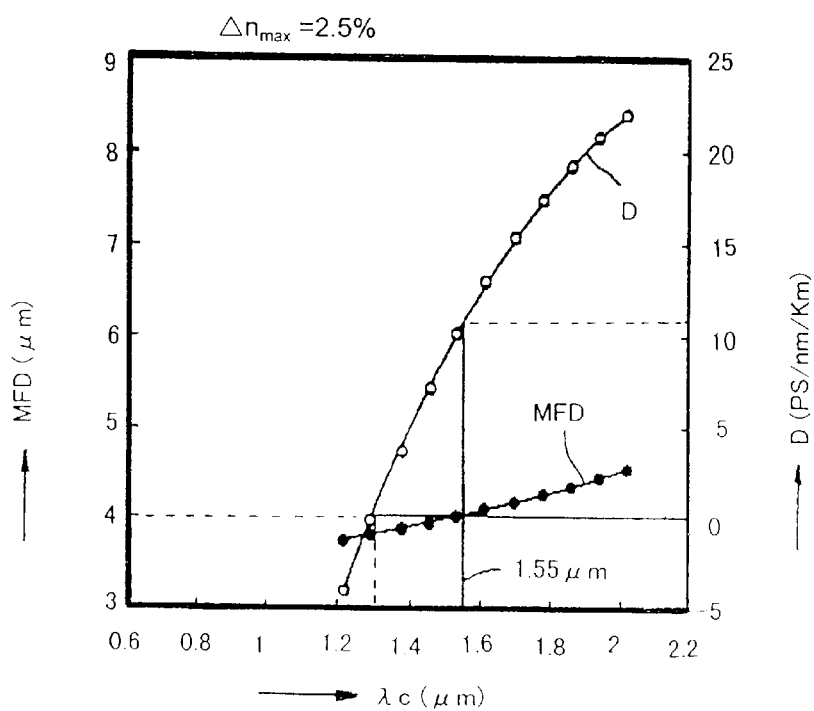
FIG. 8 shows the relationship among the cutoff wavelength λc, the dispersion D, and the modal field diameter MFD of the soliton pulse compression optical fiber when the maximum relative index difference $\Delta n_{max}$ is 2.5%.

FIG. 8 shows the relationship among the cutoff wavelength λc, the dispersion D, and the modal field diameter MFD of the soliton pulse compression optical fiber 30 when the maximum relative index difference $\Delta n_{max}$ is 2.5%. The dispersion D should decrease from 11 ps/nm/km to 0 ps/nm/km in the longitudinal direction in the region where the cutoff wavelength λc is less than 1.55 µm. Because the modal field diameter MFD is small, specifically 4.0 µm, in the region where the dispersion D is about 11 ps/nm/km, the bending loss is small. The compressibility of the soliton pulse is also good. Because the soliton pulse compression optical fiber 30 can decrease the dispersion D from 11 ps/nm/km to 0 ps/nm/km in the longitudinal direction in the region where the cutoff wavelength λc is less than 1.55 µm, it can be used as a single-mode fiber at any band where the cutoff wavelength is less than 1.55 µm.

Therefore, it is desirable for the maximum relative index difference $\Delta n_{max}$ between the core 32 and the clad 34 of the soliton pulse compression optical fiber 30 to be between 1.2% and 2.5%.

Furthermore, if the maximum relative index difference $\Delta n_{max}$ is larger than 2.0%, the dispersion D can be compressed from 13 ps/nm/km to 0 ps/nm/km in the region where the cutoff wavelength λc is less than 1.55 µm on the other hand, if the maximum relative index difference $\Delta n_{max}$ is 1.5%, the dispersion D can be compressed from 16 ps/nm/km to 0 ps/nm/km. When the maximum relative index difference $\Delta n_{max}$ is 1.5%, the dispersion is more greatly compressed than when the maximum relative index difference $\Delta n_{max}$ is more than 2.0%. Therefore, this is another reason why it is desirable for the maximum relative index difference $\Delta n_{max}$ between the core 32 and the clad 34 of the soliton pulse compression optical fiber 30 to be between 1.2% and 1.5%.

If the maximum relative index difference $\Delta n_{max}$ is 1.5%, the minimum value of the modal field diameter is 4.8 µm in the region where the cutoff wavelength λc is less than 1.55 µm. On the other hand, the minimum value of the modal field diameter is 5.4 µm when the maximum relative index difference $\Delta n_{max}$ is 1.2%. Thus, when the maximum relative index difference $\Delta n_{max}$ is 1.5%, the minimum modal field diameter is smaller than the minimum modal field diameter when the maximum relative index difference $\Delta n_{max}$ is 1.2%. Therefore, the bending loss when the maximum relative index difference $\Delta n_{max}$ is 1.5% is also smaller than the bending loss when the maximum relative index difference $\Delta n_{max}$ is 1.2%. Also, the range over which the dispersion D is compressed is between 16 ps/nm/km and 0 ps/nm/km when the maximum relative index difference $\Delta n_{max}$ is 1.5%, and that is about the same range as when the maximum relative index difference $\Delta n_{max}$ is 1.2%. Therefore, it is even more desirable for the maximum relative index difference $\Delta n_{max}$ between the core 32 and the clad 34 of the soliton pulse compression optical fiber 30 to be 1.5%.

Figure 9:
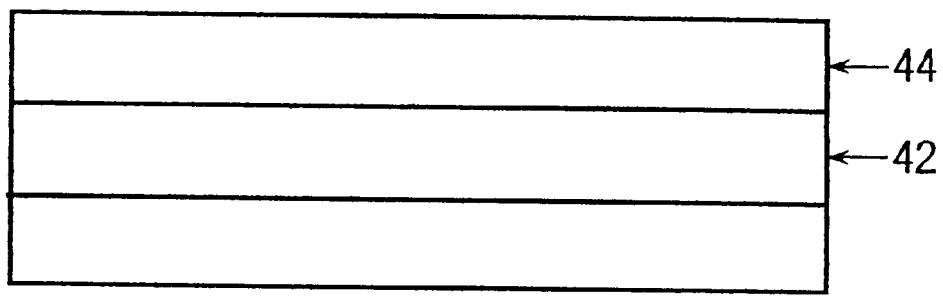
FIG. 9 is a cross sectional view of the present invention of the soliton pulse compression optical fiber preform in the longitudinal direction, that is, along the length of the soliton pulse compression optical fiber preform.

FIG. 9 is a cross sectional view of the present invention of the soliton pulse compression optical fiber preform in the longitudinal direction. It is desirable for the method of making the soliton pulse compression optical fiber preform 40 to comprise a step of preparing a core preform 42 that is to be the core 32 of the soliton pulse compression optical fiber 30 (shown in FIG. 2), and a step of surrounding the core preform 42 by a clad preform 44 whose maximum relative index difference $\Delta n_{max}$ with respect to the core preform 42 is from about 1.2% to 2.5%. It is desirable for the refractive index distribution of the core preform 42 to be step-like.

It is desirable for the method of making the soliton pulse compression optical fiber 30 to have a step of pulling the soliton pulse compression optical fiber preform 40 so that the diameter of the fiber varies in the longitudinal direction. In addition, it is desirable to study the relationship between the dispersion D and the core diameter beforehand so as to optimally control the pulling conditions.

1. First Example

An optical fiber preform was pulled 15 km in length in such a way that the resultant diameter of the fiber varied gradually from 140 µm to 110 µm in the longitudinal direction. The optical fiber preform had a maximum relative index difference $\Delta n_{max}$ between the core and the clad of 1.7%, and had a step-like refractive index distribution of the core, and had a core diameter of 4.3 mm, a clad outside diameter of 30 mm, and a length of 110 mm. Thus an optical fiber was obtained whose dispersion D decreased from 14 ps/nm/km to 2 ps/nm/km in the region where the cutoff wavelength λc is less than 1.55 µm. The bending loss of the optical fiber was 0.35 dB/km. A light pulse having a wavelength of 1.55 µm and a length of 15 ps was injected into the optical fiber, and a light pulse whose length was compressed to 7 ps was obtained.

2. First Comparison

The optical fiber preform was pulled in such a way that the resultant diameter of the fiber was 125 µm. The optical fiber preform had a maximum relative index difference $\Delta n_{max}$ between the core and the clad of 1.0%, and had a step-like refractive index distribution of the core, and had a core diameter of 4.3 mm, a clad outside diameter of 30 mm, and a length of 110 mm. In this case, the optical fiber had a large modal field diameter so that the optical fiber had a large bending loss. A light pulse having a wavelength of 1.55 µm was injected into the optical fiber, but the light pulse did not propagate within the optical fiber.

3. Second Comparison

The optical fiber preform was pulled in such a way that the resultant diameter of the fiber was 125 μm. The optical fiber preform had a maximum relative index difference $\Delta n_{max}$ between the core and the clad of 3.0%, and had step-like refractive index distribution of the core, and had a core diameter of 4.3 mm, a clad outside diameter of 30 mm, and a length of 110 mm. In this case, the optical fiber had a cutoff wavelength λc of 1.7 μm when the dispersion D was 12 ps/nm/km. Because the cutoff wavelength λc was larger than 1.55 μm, it could not be used as a single-mode fiber at bands where the cutoff wavelength is less than 1.55 μm.

What is claimed is:

1. A soliton pulse compression optical fiber for width compression of an injected light pulse, comprising:
   a core, a diameter of which decreases along a longitudinal direction of the optical fiber to reduce dispersion along a longitudinal direction of the optical fiber; and
   a clad that surrounds said core;
   wherein a maximum relative index difference between said core and said clad is between about 1.2% and 2.5%, and
   dispersion decreases more than 10 ps/nm/km from an input end of the optical fiber to an output end of the optical fiber.

2. A soliton pulse compression optical fiber as claimed in claim 1, wherein said maximum relative index difference between said core and said clad is between about 1.2% and 1.5%.

3. A soliton pulse compression optical fiber as claimed in claim 2, wherein said maximum relative index difference between said core and said clad is about 1.5%.

4. A soliton pulse compression optical fiber as claimed in claim 1, wherein a diameter of said core varies in a longitudinal direction of said soliton pulse compression optical fiber.

5. A soliton pulse compression optical fiber as claimed in claim 1, wherein a refractive index distribution of said core is step-like in form.

6. An optical fiber preform of a soliton pulse compression optical fiber for width compression of an injected light pulse, comprising:
   a core preform for a core of said soliton pulse compression optical fiber, a diameter of which decreases along a longitudinal direction of the optical fiber preform to reduce dispersion along the longitudinal direction of the optical fiber preform; and
   a clad preform that surrounds said core preform;
   wherein a maximum relative index difference between said core preform and said clad preform is between about 1.2% and 2.5%, and
   said dispersion decreases more than 10 ps/nm/km from an input end of the optical fiber to an output end of the optical fiber.

7. An optical fiber preform as claimed in claim 6, wherein said maximum relative index difference between said core preform and said clad preform is between about 1.2% and 1.5%.

8. An optical fiber preform as claimed in claim 7, wherein said maximum relative index difference between said core preform and said clad preform is about 1.5%.

9. An optical fiber preform as claimed in claim 6, wherein a refractive index distribution of said core preform is step-like in form.

10. A method for making an optical fiber preform of a soliton pulse compression optical fiber for width compression of an injected light pulse, comprising the steps of:
    preparing a core preform for a core of said soliton pulse compression optical fiber, such that a diameter of the core decreases along a longitudinal direction of the optical fiber preform to reduce dispersion along the longitudinal direction of the optical fiber preform; and
    forming a clad preform that surrounds said core preform;
    whereby a maximum relative index difference between said core preform and said clad preform is between about 1.2% and 2.5%, and
    said dispersion decreases more than 10 ps/nm/km from an input end of the optical fiber to an output end of the optical fiber.

11. A method for making an optical fiber preform as claimed in claim 10, wherein said maximum relative index difference between said core preform and said clad preform is between about 1.2% and 1.5%.

12. A method for making an optical fiber preform as claimed in claim 11, wherein said maximum relative index difference between said core preform and said clad preform is about 1.5%.

13. A method for making an optical fiber preform as claimed in claim 10, wherein a refractive index distribution of said core preform is step-like in form.

14. A method for making a soliton pulse compression optical fiber for width compression of an injected light pulse, comprising the steps of:
    preparing a core preform for a core of said soliton pulse compression optical fiber;
    forming a clad preform that surrounds said core preform with a maximum relative index difference between said core preform and said clad preform of between about 1.2% and 2.5%; and
    pulling said soliton pulse compression optical fiber preform, so that a diameter of said core decreases along a longitudinal direction of the optical fiber;
    whereby a diameter of said soliton pulse compression optical fiber varies in a longitudinal direction, and
    said dispersion decreases more than 10 ps/nm/km from an input end of the optical fiber to an output end of the optical fiber.

15. A method for making a soliton pulse compression optical fiber as claimed in claim 14, wherein said maximum relative index difference between said core and said clad is between about 1.2% and 1.5%.

16. A method for making a soliton pulse compression optical fiber as claimed in claim 15, wherein said maximum relative index difference between said core and said clad is about 1.5%.

17. A method for making a soliton pulse compression optical fiber as claimed in claim 14, wherein a diameter of said core varies in a longitudinal direction of said soliton pulse compression optical fiber.

18. A method for making a soliton pulse compression optical fiber as claimed in claim 14, wherein a refractive index distribution of said core is step-like in form.

19. A method for making a soliton pulse compression optical fiber as claimed in claim 14, wherein dispersion decreases more than 10 ps/nm/km from an input end of the optical fiber to an output end of the optical fiber.

20. A soliton pulse compression optical fiber for width compression of an injected light pulse, comprising:
    a core, a diameter of which decreases along a longitudinal direction of the optical fiber to reduce dispersion along the longitudinal direction of the optical fiber; and
    a clad that surrounds said core;

wherein a maximum relative index difference between said core and said clad is between about 1.2% and 2.5%.

21. An optical fiber preform of a soliton pulse compression optical fiber for width compression of an injected light pulse, comprising:

a core preform for a core of said soliton pulse compression optical fiber, a diameter of which decreases along a longitudinal direction of the optical fiber preform to reduce dispersion along the longitudinal direction of the optical fiber preform; and a clad preform that surrounds said core preform;

wherein a maximum relative index difference between said core preform and said clad preform is between about 1.2% and 2.5%.

* * * * *